United States Patent [19]

Takehara

[11] 3,823,508
[45] July 16, 1974

[54] PLANT CULTIVATING APPARATUS

[76] Inventor: Hiraki Takehara, Nigawa-cho 3-chome 13-ban 7-go, 662 Hyogo-ken, Nishinomiya-shi, Japan

[22] Filed: June 30, 1972

[21] Appl. No.: 268,170

[30] Foreign Application Priority Data
July 1, 1971 Japan................................ 46-48390
Feb. 19, 1972 Japan................................ 47-17493
Mar. 4, 1972 Japan................................ 47-26702

[52] U.S. Cl......................................... 47/1.2, 47/34
[51] Int. Cl.............................................. A01g 9/02
[58] Field of Search........... 47/1.2, 38, 38.1, 39, 14, 47/16

[56] References Cited
UNITED STATES PATENTS
2,169,701 8/1939 Lund..................................... 47/1.2
2,486,512 11/1949 Armstrong............................. 47/1.2
3,199,250 8/1965 Sawyer................................... 47/1.2
3,271,900 9/1966 Mori..................................... 47/38.1
3,305,968 2/1967 Dosedla et al......................... 47/1.2
3,603,034 9/1971 Maxwell........................... 47/1.2 UX
3,660,933 5/1970 Wong................................... 47/1.2

Primary Examiner—Robert E. Bagwill
Attorney, Agent, or Firm—Edwin E. Greigg

[57] ABSTRACT

A plant cultivating apparatus comprising a tray member having recessed portions on the upper surface for collecting a liquid fertilizer, recessed portions on the lower surface for ventilation, and openings for establishing communication between the upper and lower surface sides, the tray member being disposed in a root growing space, whereby sufficient amounts of fertilizer and air are fed to the roots of plants being cultivated.

18 Claims, 5 Drawing Figures

3,823,508

PLANT CULTIVATING APPARATUS

BACKGROUND OF THE INVENTION

Heretofore, the cultivation of plants in a highly water-permeable soil such as soil containing sand or gravel has been practically impossible since the liquid fertilizer and water instantly permeate the soil, causing on retention of fertilizer and water.

Further, attempts to condition such highly water-permeable soil to be suited to the cultivation of plants have proved to be economically unacceptable since they incur prohibitively large amounts of money and labor.

Therefore, vast areas of land have been left idle without being utilized for the cultivation of plants because of their high waterpermeability, but, due to world food shortages we now need to utilize such vast areas of land.

The present invention has succeeded in developing a plant cultivating apparatus which satisfies such a need.

SUMMARY OF THE INVENTION

The present invention relates to a useful plant cultivating apparatus which is capable of sufficiently feeding a liquid fertilizer and air to the roots of plants without interfering with the growth of the roots and of storing the supplied liquid fertilizer and water adjacent the roots for a prolonged period of time to permit the roots to absorb them, whereby the cultivation of plants is made possible even in a highly water-permeable soil.

A plant cultivating apparatus according to the invention comprises at least one tray member with upper and lower surfaces having recessed portions on the upper surface for collecting a liquid fertilizer, recessed portions on the lower surface for ventilation and openings for communication between the upper and lower surfaces, which apparatus is extremely simple in construction and easy to manufacture and can be offered at low cost.

The tray member according to the invention may be used as a single layer or in a tiered form. Thus, the roots of plants are permitted to fully grow through said openings while absorbing the liquid fertilizer and water collected in the recessed portions on the upper surface and breathing the oxygen in the air collected in the recessed portions on the lower surface, whereby the satisfactory cultivation of plants is carried out without causing incomplete growth due to the lack of fertilizer and water, root rot due to the lack of oxygen, etc.

Particularly in the case of the cultivation of plants in a highly water-permeable soil, said plant cultivating apparatus is embedded in the ground to permit a liquid fertilizer and water sprinkled on the ground and penetrating into the ground to collect in the aforesaid recessed portions on the upper surface. In this way the cultivation of plants in a highly water-permeable soil which has heretofore been given up as barren is made possible without requiring large amounts of fertilizer and water.

Further, the plant cultivating apparatus itself is available at very low cost and the operation of embedding it in the ground is simple.

Further, the plant cultivating apparatus is useful for hydroponic cultivation of plants in agriculture, home horticulture and other application.

An object of the invention is to provide a plant cultivating apparatus which is capable of reliably and economically carrying out the satisfactory cultivation of plants.

Another object of the invention is to provide a plant cultivating apparatus which makes economically possible the satisfactory cultivation of plants in a highly water-permeable soil.

A further object of the invention is to provide a plant cultivating apparatus which can be massproduced at very low cost.

A still further object of the invention is to provide a plant cultivating apparatus which ensures the sufficient feeding of fertilizer, water and oxygen to the roots of plants without interfering with the growth of the roots.

A still further object of the invention is to provide a plant cultivating apparatus which is useful for hydroponic cultivation of plats.

A still further object of the invention is to provide a plant cultivating apparatus which can prevent waste a fertilizer and water.

DESCRIPTION OF THE PREFERRED EMBODIMENT

The present invention will now be described with reference to a preferred embodiment thereof.

Figure 1:
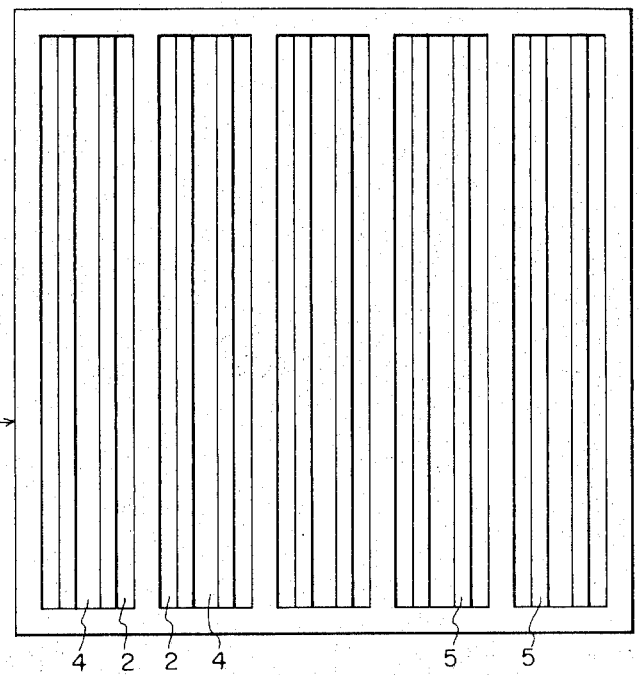
FIG. 1 is a plane view of a plant cultivating apparatus.
Figure 2:
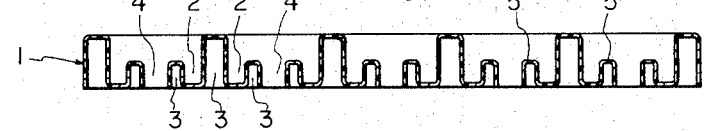
FIG. 2 is a section taken along the line II—II of FIG. 1.

A plant cultivating apparatus according to the invention, as shown in FIGS. 1 and 2, comprises at least one sinuous tray member 1 which is made of a hard or relatively hard synthetic resin molded as one body. The tray member has a number of recessed portions 2 on the upper surface for collecting a liquid fertilizer, a number of cooperatively recessed portions 3 on the lower surface for ventilation and a number of openings 4 for establishing communication between the upper and lower surface sides. The recessed portions 2 and 3 and openings 4 respectively have a slender plane shape, and they are parallel to each other. The configuration and disposition of said recessed portions 2 and 3 on the upper and lower surfaces and said openings 4 may be changed.

Offstanding protrusions 5 and 5' form the recessed portions 2 on the upper surface, and the recessed portions 3 on the lower surface. The protrusions are laterally disposed with respect to a central protrusion 5' adjacent to said openings 4 and are reduced in height with respect to protrusion 5' to make it easier for the roots of plants 6 to enter the recessed portions 2 on the upper surface when the tray members 1 are arranged in tiers.

Figure 3:
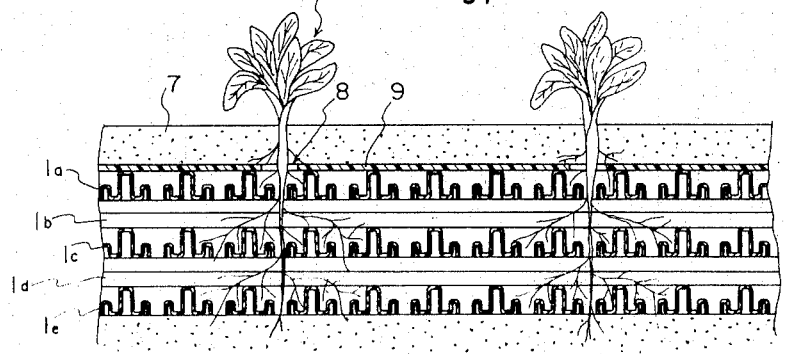
FIG. 3 is a longitudinal cross section showing a manner in which such plant cultivating apparatus may be used.

The plant cultivating apparatus described above is used in a manner shown in FIG. 3 wherein three tray members 1a - 1e are shown but any other number of tray members may be used. Thus, a plurality of tray members 1a - 1e are tiered in such a manner that adjacent tray members 1 have their recessed portions 2 and 3 and openings 4 mutually offset horizontally. The group of tray members 1a - 1e tiered as described above are embedded or placed below the ground surface 7 to define a space where the roots of plants 6 will grow. Since the liquid fertilizer and water can be stored in the recessed portions 2 on the upper surface of the respective tray members 1a - 1e, the liquid fertilizer and water can be efficiently and reliably absorbed by the roots without regard to the nature of the soil. Further, since a number of the recessed portions 3 exist, a large amount of air is retained in the spaces defined by the group of tray members 1a - 1e, whereby the feeding of oxygen to the roots is fully effected. Further, when the liquid fertilizer and water flow down through the openings 4, oxygen will dissolve well in the liquid fertilizer and water.

The numeral 9 denotes a mat such as of polyurethane foam, having openings 8 for insertion of plant 6 therein. The mat 9 may overlay the tray members 1 to prevent the entry of earth and sand into the space defined by the tray members 1 in order that liquid fertilizer, water, and air may be retained pure.

Figure 4:
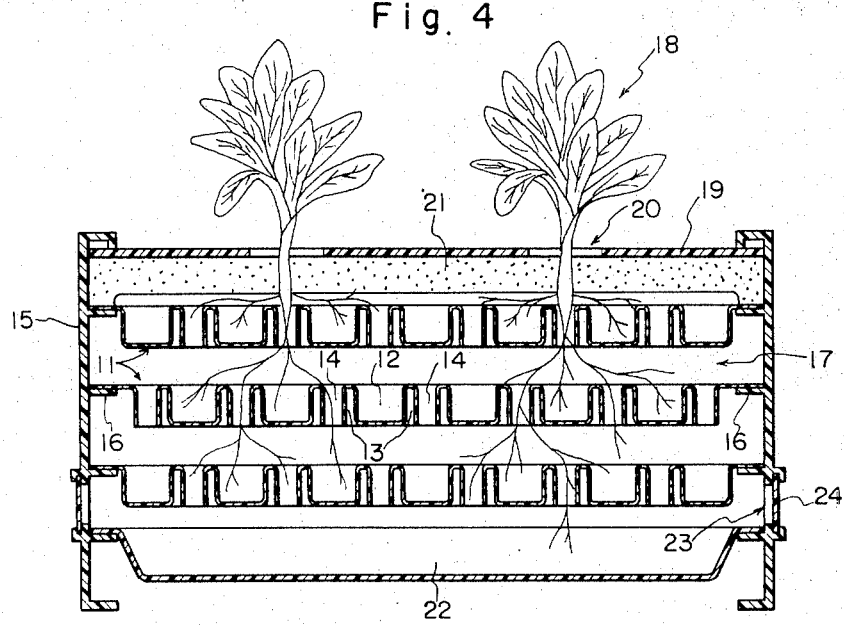
FIG. 4 is a section showing another preferred embodiment of a plant cultivating apparatus.
Figure 5:
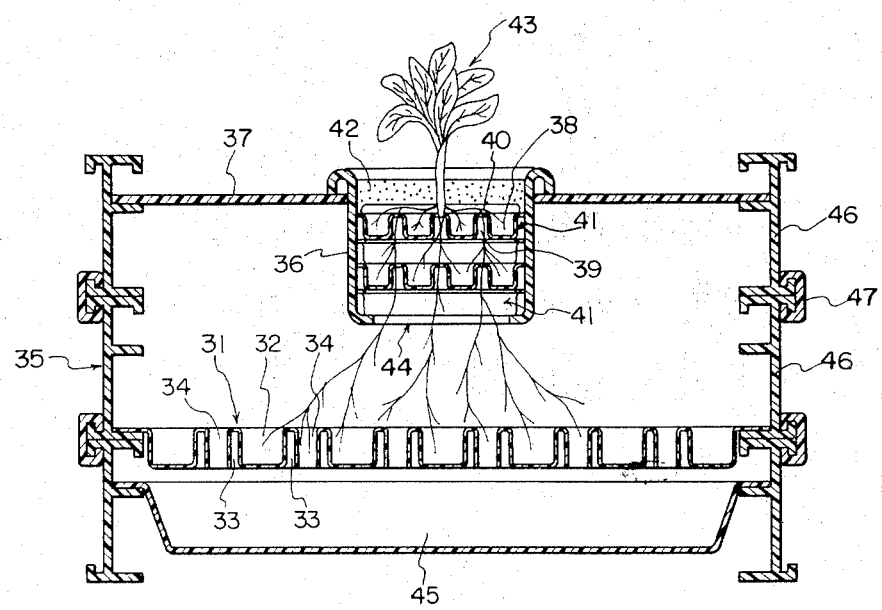
FIG. 5 is a section showing another preferred embodiment of a plant cultivating apparatus.

The cultivating apparatus according to the invention is applied to hydroponic cultivation of plants in the embodiments shown FIGS. 4 and 5.

In FIG. 4, the numeral 11 denotes tray members having a number of recessed portions 12 on the upper surface for collecting a liquid fertilizer, a number of cooperatively formed recessed portions 13 on the lower surface for ventilation and a number of openings 14 for establishing communication between the upper and lower surface sides. The recessed portions 12 and 13 and openings 14 respectively have a slender plane shape, and they are parallel to each other.

The numeral 15 denotes a frame for retained the tray members 1 therein, and projections 16 of the frame 15 support the tray members 1 respectively to form a space between the adjacent two tray members 1. Considering together two tray members 1, the upper recessed portions 12 of one tray member 1 and the opening 14 of another tray member 1 are aligned, whereby liquid fertilizer and water fills the upper recessed portions 12 of the upper tray member 1, and then the liquid fertilizer and water flows down into the upper recessed portions 12 of the lower tray member 1 through the openings 14 of the upper tray member 1.

The numeral 19 denotes a mat having a plurality of openings 20 for determining the position of planting. The numeral 21 denotes a permeable elastic body such as of polyurethane foam having cracks for insertion of a plant therethrough and for support of a plant 18 therein, the elastic body 21 being located over the tier of the tray members 1. The numeral 22 denotes a vessel for collecting liquid fertilizer and water supplied over that which is needed. The numeral 23 denotes openings for ventilation inlets having a lid 24 for controlling the humidity in the frame 15.

In FIG. 5, the numeral 31 denotes a tray member having a number of recessed portions 32 on the upper surface for collecting liquid fertilizer, a number of recessed portions 33 on the lower surface for ventiliation and a number of openings 34 for establishing communication between the upper and lower surfaces of a tray member body 31 located in a low position in a casing 35. The casing 35 is covered with a panel 37 having at least one opening for insertion and support of a pot 36.

A plurality of tray members 41 is arranged in a tier in the pot 36, the tray members 41 respectively having a number of recessed portions 38 on the upper surface for collecting liquid fertilizer, a number of recessed portions 39 on the lower surface for ventilation and a number of openings 40 for establishing communication between the upper and lower surfaces.

The numeral 42 denotes a permeable elastic body having cracks for insertion of a plant 43 therethrough and support of said plant therein, the elastic body 42 being located over the tier of the tray members 41 in the pot 36, which. The pot 36 has an opening 44 in its bottom is located in an upper extremety of the casing 35. Roots of the plant 43 are permitted to grow downward through the opening 44, thereby absorbing liquid fertilizer and water from the upper recessed portions 38 of the tray members 41 in early growth stages and from the upper recessed portions of tray member 31 in later growth stages. The numeral 45 denotes a vessel for collecting liquid fertilizer and water supplied over that which the tray members can hold.

The casing 35 is constructed of a plurality of parts 46 connected to each other with connectors 47 in known fashion, so that the volume and depth of the casing 35 can be changed according to the growth of the roots.

The horizontal section area of the pot 36 is small relative to the horizontal section area of the casing 35, so that it is possible to make the width consumed by the tray members 31 smaller in comparison to the depth required by the tiers in the tray members 31 are arranged. Therefore, the cultivation of the plants 43 is carried out economically in terms of horizontal space requirements.

In FIGS. 4 and 5, the tray members 11 and 41 have a similar effect to that of the abovementioned tray members 1. Namely, the tray members 11 and 41 store liquid fertilizer, water and air in the space of the roots growth.

What I claim is:

1. A plant cultivating apparatus comprising a housing, mounting means within said housing for mounting a plurality of integral plastic trays adapted to support plant life, said trays being superimposed in a vertically spaced array and each including top, bottom, side and end walls, said side and end walls being coplanar so that they define an elevated frame about the perimeter of said tray, a plurality of spaced longitudinally extending slotted openings through said bottom wall, said slotted openings being parallel to each other and to said side walls and terminating adjacent to said end walls, and a plurality of spaced longitudinally extending members each having laterally spaced upstanding protrusions between which at least one channel is defined, said members being parallel to each other and to said side walls and terminating adjacent to said end walls, with adjacent pairs of upstanding protrusions straddling said slotted openings.

2. A plant cultivating apparatus as claimed in claim 1, in which each said longitudinally extending member includes three upstanding protrusions with two of said protrusions straddling adjacent slotted openings and terminating in a plane beneath the plane of the top wall of the frame, said two protrusions defining a low top wall, and with the third protrusion terminating in a plane at the top wall of the frame, said third protrusion defining a high top wall.

3. A plant cultivating apparatus as claimed in claim 2, in which said third upstanding protrusion divides the space between said two upstanding protrusions into two channels.

4. A plant cultivating apparatus as claimed in claim 3, in which said side walls are parallel with each other and said end walls are parallel with each other.

5. A plant cultivating apparatus as claimed in claim 4, in which said plurality of trays are superimposed in a stack in a ground and said trays are rotated alternately about 90° in said ground.

6. A plant cultivating apparatus as claimed in claim 5, in which a plastic mat is positioned above the uppermost portion of said trays, the plastic mat prevents soil and sand from flowing on said trays, and said plastic mat has at least one opening that permits the root of the plant to grow therethrough.

7. A plant cultivating apparatus as claimed in claim 1, in which said housing has parallel spaced side and end walls, at least two of said oppositely disposed spaced side walls including horizontally arranged inwardly extending shelf portions capable of supporting in vertically spaced array a plurality of said trays.

8. A plant cultivating apparatus as claimed in claim 7, in which the uppermost of said trays is arranged to support a blanket of polyurethane foam having preformed opening therein.

9. A plant cultivating apparatus as claimed in claim 8, in which the housing is assemblable from a plurality of stackable elements.

10. A plant cultivating apparatus as claimed in claim 8, further comprising at least one pot-like element having an opening on its bottom, the bottom of said pot-like element being located in the housing, the housing have at least one of said trays below the bottom of the pot-like element, and said pot-like element having said trays therein.

11. An integral plastic tray adapted to support plant life including top, bottom, side and end walls, said side and end walls being coplanar so that they define an elevated frame about the perimeter of said tray, a plurality of spaced longitudinally extending slotted openings through said bottom wall, said slotted openings being parallel to each other and to said side walls and terminating adjacent to said end walls and a plurality of spaced longitudinally extending members each having laterally spaced upstanding protrusions between which at least one channel is defined, said members being parallel to each other and to said side walls and terminating adjacent to said end walls, with adjacent pairs of upstanding protrusions straddling said slotted openings.

12. An integral plastic tray as claimed in claim 11, in which the periphery of the frame extends laterally therefrom to provide a flange.

13. An integral plastic tray as claimed in claim 11, in which the frame terminates in a dependent U-shaped channel.

14. An integral plastic tray as claimed in claim 11, in which at least one of the upstanding protrusions terminates in a plane beneath the plane of the top wall of the frame.

15. An integral plastic tray as claimed in claim 11, in which the upstanding protrusions terminate in the plane of the top wall of the frame.

16. An integral plastic tray as claimed in claim 11, in which said parallel spaced longitudinally extending members include at least three upstanding protrusions defining therebetween a plurality of channels.

17. An integral plastic tray as claimed in claim 16, in which the protrusions are closed at the top and opened at the bottom.

18. An integral plastic tray as claimed in claim 11, in which each said longitudinally extending member includes three upstanding protrusions with two of said protrusions straddling adjacent slotted openings and terminating in a plane beneath the plane of the top wall of the frame, and with the third protrusion terminating in a plane at the top wall of the frame.

* * * * *